(12) United States Patent
Murota et al.

(10) Patent No.: US 7,408,278 B2
(45) Date of Patent: *Aug. 5, 2008

(54) MOTOR-GENERATOR WITH ADJUSTABLE AXIAL GAP FOR VEHICLE

(75) Inventors: Keiko Murota, Shizuoka (JP); Shinya Naito, Shizuoka (JP); Haruyoshi Hino, Shizuoka (JP); Hiroyuki Ishihara, Shizuoka (JP); Junji Terada, Shizuoka (JP); Tomohiro Ono, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 438 days.

This patent is subject to a terminal disclaimer.

(21) Appl. No.: 10/523,283

(22) PCT Filed: Aug. 8, 2003

(86) PCT No.: PCT/JP03/10180

§ 371 (c)(1),
(2), (4) Date: Sep. 30, 2005

(87) PCT Pub. No.: WO2004/015847

PCT Pub. Date: Feb. 19, 2004

(65) Prior Publication Data

US 2006/0097603 A1    May 11, 2006

(30) Foreign Application Priority Data

Aug. 9, 2002  (JP) .............................. 2002-233944
Mar. 31, 2003  (JP) .............................. 2003-096669

(51) Int. Cl.
*H02K 21/24*    (2006.01)
*H02K 1/27*    (2006.01)

(52) U.S. Cl. .................. 310/75 R; 310/80; 310/156.32; 310/191; 310/209

(58) Field of Classification Search ............... 310/75 R, 310/80, 112, 156.32–156.37, 190, 191, 209
See application file for complete search history.

(56) References Cited

U.S. PATENT DOCUMENTS 4,959,578 A * 9/1990 Varga .......................... 310/268

(Continued)

FOREIGN PATENT DOCUMENTS

JP       56-171558       12/1981

(Continued)

OTHER PUBLICATIONS

European Search Report for corresponding European application No. 03784637.5-2207 lists the references above.

*Primary Examiner*—Karl Tamai
*Assistant Examiner*—David W. Scheuermann
(74) *Attorney, Agent, or Firm*—Hogan & Hartson LLP

(57) ABSTRACT

A rotary electric machine capable of optionally adjusting output characteristic and an electric motor vehicle using the rotary electric machine are provided.

A rotary electric machine is constituted with: a rotary shaft 220; a rotor 40 connected to the rotary shaft 220; a stator 31 placed opposite the rotor 40; a stepping motor 60 serving as an adjusting motor for adjusting the position of the rotor 40 relative to the stator 31 in the rotary axis direction; and a movable member 47 or the like that is engaged to the rotor 40 and converts the rotation of the adjusting motor 60 into the displacement of the movable member 47 in the axial direction of the rotary shaft 220.

19 Claims, 6 Drawing Sheets

U.S. PATENT DOCUMENTS

| | | |
|---|---|---|
| 5,057,728 A | 10/1991 | Dammeyer et al. |
| 5,763,977 A * | 6/1998 | Shimasaki et al. .......... 310/191 |
| 6,455,975 B1 * | 9/2002 | Raad et al. ................. 310/209 |
| 7,309,941 B2 * | 12/2007 | Murota et al. ............... 310/268 |
| 2006/0097603 A1 * | 5/2006 | Murota et al. ............... 310/261 |

FOREIGN PATENT DOCUMENTS

| | | |
|---|---|---|
| JP | 05199705 A | 8/1993 |
| JP | 07-250465 | 9/1995 |
| JP | 09-028067 | 1/1997 |
| JP | 09-037598 | 2/1997 |
| JP | 09-098558 | 4/1997 |
| JP | 09-308200 | 11/1997 |
| JP | 2002-233176 | 8/2002 |
| JP | 2002-233944 | 8/2002 |
| JP | 2002325412 A * | 11/2002 |
| JP | 2004-135486 | 4/2004 |
| WO | 9956380 A2 | 11/1999 |

* cited by examiner (a)

(b)

(c)

MOTOR-GENERATOR WITH ADJUSTABLE AXIAL GAP FOR VEHICLE

BACKGROUND OF THE INVENTION

1. Field of the Invention

This invention relates to a rotary electric machine capable of changing its output characteristic and to a vehicle driven by the rotary electric machine.

2. Background Art

A conventional technique related to the electric motor includes a gap between the stator teeth and the rotor magnet being adjusted.

As shown in FIG. 6, when a fastening-adjusting member 160 is loosened by an operation made to a head 162, a bushing 146 and a drum rotary member 125 move away from each other with the restoring force of a resilient member 161. As a result, the gap G between a rotor magnet 141 and a motor stator 130 increases. When the fastening-adjusting member 160 is tightened, the bushing 146 and the drum rotary member 125 approach each other, so that the gap G decreases.

The above constitution is devised to cope with the change in the specification of a product. In other words, the device for adjusting the gap between rotor and stator related to an axial gap motor is disclosed as an embodiment capable of adjusting the gap only before the device being attached to the product, not as an embodiment capable of adjusting the gap while the product is in operation for operating the product under an optimum condition. While part of the specification describes electromagnetic operation and manual operation, no specific embodiment is disclosed. This is due to the absence of the necessity for examining a means of solving the problem of actively changing the characteristic of an electric motor such as the driving source of an electric motor vehicle by optionally changing the gap while the product is in operation.

Another conventional electric motor relates to a reel motor for rotary-driving a reel of a tape recorder. The invention relates to an axial gap motor, disclosing a manner of adjusting the gap between rotor and stator by controlling the axial displacement using both a spring attached to a shaft and magnetic force of an electromagnet by changing the current flowing through the electromagnet in proportion to the current flowing through the motor. However, the gap adjustment in consideration of the motor rotational speed cannot be made with the combination of the spring and the electromagnet proportional to the current flowing through the motor. When the gap, as in the electric motor vehicle, must be adjusted to cope with the constant changes in the road conditions, such as uphill gradient and vehicle speed, it is impossible to do so with a gap controlling device that makes all such conditions represented with the current flowing through the motor. Therefore, a more active and intelligent gap adjusting device is needed.

Another conventional electric motor relates to a control device for a generator for use in vehicles. According to the invention, the generator characteristic is changed by adjusting the gap of a radial gap motor. However, because the rotor is displaced with a solenoid, fine control cannot be made and it is hard to apply the device to the motor in electric motor vehicles that require fine control according to the driving force and the vehicle speed. It is especially hard to realize the control in an axial gap type that exhibits a wide change in the characteristic with a slight change in the gap. While an example is shown there in which the stator is moved with a motor and screw, it is impossible to move the rotor, while it is rotating, with such a constitution.

SUMMARY OF THE INVENTION

In view of the above, for the electric motor capable of optionally changing the output characteristic, a device is required to change the flux amount of a magnet by changing the relative distance between the rotor and stator in the axial direction. In particular for application to driving motors of electric motor vehicles, active and fine control is required. That is to say, a large amount of magnetic flux is required at the time of starting because starting requires a great torque, while a small amount of magnetic flux is required at the time of a high speed operation because the operation requires high rotational speed. For the electric motor vehicle, an electric motor of a high efficiency is also required to extend the cruising range. Accurate control is required to choose a motor current of a highest efficiency for obtaining an intended torque and revolution, and to choose the magnetic flux amount by changing the relative positions of the rotor and stator. There is another problem particular to the electric motor vehicle such that when the rider walks to roll the vehicle, extra effort is required as resisting force is produced with the attractive force between the stator and rotor.

Therefore, an advantage of this invention is to provide a rotary electric machine capable of optionally changing its output characteristic and an electric motor vehicle using the rotary electric machine.

To solve the above problems an embodiment of the present invention relates to a rotary electric machine provided with a rotary shaft; a rotor connected to the rotary shaft; a stator placed opposite the rotor; an adjusting motor for adjusting relative positions of the rotor and the stator in the direction of the rotary shaft; and a movable member that is engaged to the rotor and converts the rotation of the adjusting motor into the displacement of the movable member in the direction of the rotary shaft.

The movable member moving in the axial direction with the rotation of the adjusting motor is engaged to the rotor. Therefore, it is possible to adjust the gap between the rotor and stator if the rotary electric machine is of an axial gap type, adjust the opposing areas of the rotor and stator if the rotary electric machine is of a radial gap type, and adjust the gap between and the opposing areas of the rotor and stator if the rotary electric machine is of a conical gap type. Accordingly, the magnetic flux amount of the magnet can be actively adjusted. Therefore, it is possible to provide a rotary electric machine capable of optionally changing the output characteristic to produce a great amount of magnetic flux when a great torque is required and to produce a small amount of magnetic flux when a small torque is required, and further capable of reducing the rolling resisting force due to the attractive force of the motor magnet by reducing the magnetic flux amount when the rotary electric machine is used as the driving motor of an electric motor motorcycle.

Incidentally, the term engaged used herein means either completely fixed, clearance-fit or the like, or merely in contact. The movable member may be either completely connected to the rotor or not connected completely as long as it prevents the rotor from being moved toward the stator with the attractive force of the magnet. For example, it is possible to move the rotor by bringing the movable member into contact with the rotor to push the rotor in the direction opposite the magnetic attractive force. In the direction of the magnetic attractive force, it is not necessarily required to pull the rotor with the movable member. It is possible to move the rotor to a specified position with the magnetic attractive force by moving the movable member. When the movable member is placed on the side of pulling the rotor against the magnetic attractive force, it is also possible in the same manner to move the rotor up to a specified position with the magnetic attractive force in the direction of the magnetic attractive force by bringing the movable member into contact with the rotor to pull the rotor.

Because the rotor, rather than a heavy stator made of iron core and copper wire, is moved according to this invention, the adjusting motor can remain small in size. The rotary electric machine, when it is applied to electric motor vehicles or the like, is subjected to heavy vibration and impact load. Therefore, the heavy stator must stand heavy loads. If the stator is to be moved, it cannot be fastened firmly to a case or the like using bolts. A mechanism that prevents rotation while permitting axial motion must coexist with a constitution that can stand heavy loads, which results in heavyweight. According to this invention, however, such mechanism and constitution are eliminated.

The rotor of the adjusting motor spirally engages with the movable member to permit relative motion. The rotor of the adjusting motor spirally engages with the movable member to permit relative motion. Therefore, a rotary electric machine is provided that makes it possible to control the amount of motion of the movable member by the rotation of the rotor of the adjusting motor relative to the movable member.

As examples of engagement that permits relative spiral motion, an engagement using skewed serrations or helical gears, and an engagement using a helical slot and a pin fitting in the slot may be enumerated.

The movable member is rotatably engaged to the rotor, and a device is provided for preventing the movable member from rotating together with the rotation of the rotor of the adjusting motor.

The movable member is rotatably engaged through a bearing or the like to the rotor and is prevented from rotating together with the rotation of the rotor of the adjusting motor. As a result, it is possible to provide a rotary electric machine having the following features. It is possible to control accurately by securely moving the movable member in the axial direction by the rotation of the adjusting motor. Because the movable member does not rotate irrespective of rotating or standing state of the rotary electric machine, complicated control is unnecessary such as controlling the revolution of the adjusting motor depending on the rotating or standing state of the rotor of the rotary electric machine for the axial motion or controlling to rotate the rotor of the adjusting motor at the same speed as that of the rotor of the rotary electric machine when the rotor of the rotary electric machine is not moved in the axial direction. Because the adjusting motor has only to make rotation necessary for the amount of axial motion, consumption of electricity is reduced.

The movable member engages with the rotation stop member fit around the rotor shaft of the adjusting motor so as to be incapable of making relative rotation around but slidable in the axial direction of the rotor shaft of the adjusting motor.

The rotation stop member fit around the rotor shaft of the adjusting motor prevents the movable member rotating relative to the rotor shaft of the adjusting motor but permits sliding in the axial direction of the rotor shaft of the adjusting motor. Therefore, it is possible to provide a rotary electric machine capable of securely preventing the movable member from rotating.

The rotation stop portion of the rotation stop member is formed in a particular shape in cross section.

The rotation stop portion of the rotation stop member is formed in a particular shape in cross section. Therefore, it is possible to provide a rotary electric machine capable of securely preventing the movable member from rotating. The term particular shape used herein means any shape other than circular.

Opposing surfaces of the movable member and the rotation stop member fit around the rotor shaft of the adjusting motor are each provided with at least one groove in the direction of the rotor shaft of the adjusting motor, and a ball is placed between each groove on the movable member side and each groove on the rotation stop member side.

Opposing surfaces of the movable member and the rotation stop member fit around the rotor shaft of the adjusting motor are each provided with at least one groove in the direction of the rotor shaft of the adjusting motor, and a ball is placed between each groove on the movable member side and each groove on the rotation stop member side. Therefore, rotation of the movable member is securely prevented with the grooves and balls, axial motion is made smooth while loss is reduced, and torque of the adjusting motor is reduced, so that downsizing is possible. Therefore, it is possible to provide a compact rotary electric machine.

The rotor of the adjusting motor is in spiral engagement with the movable member.

The rotor of the adjusting motor is in spiral engagement with the movable member. Therefore, it is possible to provide a rotary electric machine capable of reducing the amount of motion of the movable member per revolution of the adjusting motor and capable of controlling more accurately.

A spring is provided to urge the movable member in the direction of offsetting the force exerted to the movable member due to the magnetic attractive force produced between the rotor and the stator.

A resilient member is provided to urge the movable member in the direction of offsetting the force exerted to the movable member due to the magnetic attractive force produced between the rotor and the stator. Therefore, the force required to move the movable member is reduced, and the frictional force in the engagement areas of the movable member and the rotor of the adjusting motor is reduced. As a result, it is possible to reduce the torque of the adjusting motor, to reduce the size and power consumption, and to provide a rotary electric machine that is compact with a high efficiency.

The adjusting motor is a stepping motor. Because the adjusting motor is a stepping motor, the amount of rotation can be controlled with the number of driving pulses. As a result, a sensor or the like for finding the amount of rotation (or amount of motion) is unnecessary, so that a rotary electric machine is provided in which the adjusting motor is made at a low cost and the control is simplified.

According to an embodiment of the present invention the rotary electric machine is used as a driving source. Therefore, it is possible to provide an electric motor vehicle capable of optionally changing its driving characteristic and reducing resisting force when the vehicle is rolled along by walking.

DETAILED DESCRIPTION OF THE INVENTION

Embodiments of the invention are described below in reference to the appended drawings.

Figure 1:
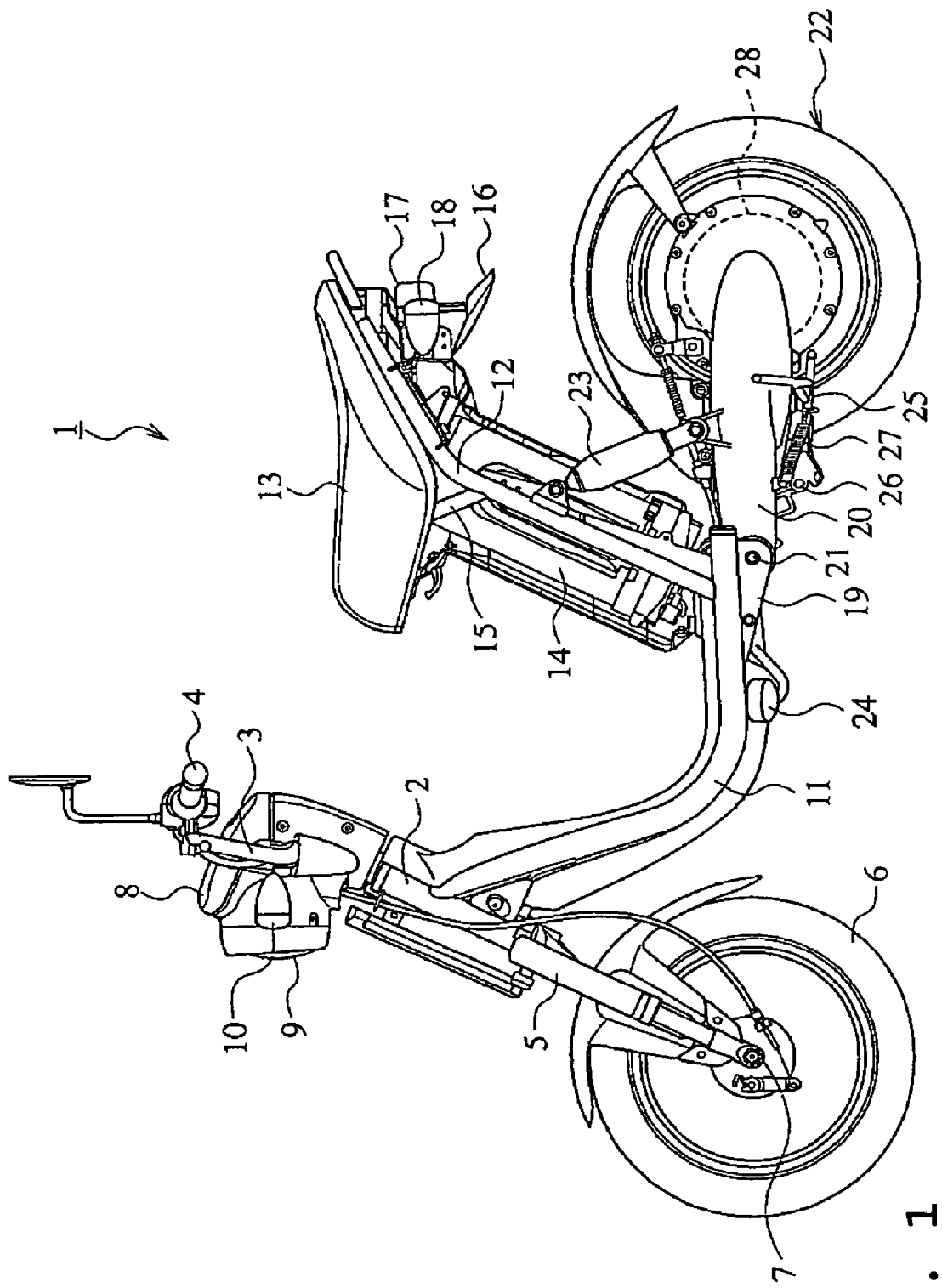
FIG. 1 is a side view of an electric motorcycle related to an embodiment of the invention.

FIG. 1 is a side view of an electric motorcycle employing an electric motor according to the invention.

The electric motorcycle 1 shown in FIG. 1 includes a head pipe 2 at the front upper part of its vehicle body. Through the head pipe 2 is inserted a steering shaft (not shown) to be freely turned. Handlebars 3 are attached to the top end of the steering shaft. Both ends of the handlebars 3 are each provided with a grip 4. The grip 4 on the right hand (hidden side in FIG. 1, not shown) serves as a throttle grip that can be twisted.

At the lower end of the head pipe 2 is attached the top end of a pair of right and left front forks 5. At the lower end of the front fork 5 is supported a front wheel 6 for free rotation about a front wheel shaft 7. A meter 8 is placed in the central upper part of the handlebars 3, below which is placed a headlamp 9, on both sides of which are placed turn signal lamps 10 (only one is shown FIG. 1).

Paired right and left vehicle frame members 11 extend from the head pipe 2 toward the rear of the vehicle body. That is, the vehicle frame members 11 made of round pipes extend from the head pipe 2 obliquely down rearward, curve in an arc toward the rear, and extend nearly horizontally toward the rear of the vehicle body. Paired right and left vehicle frame members 12 extend obliquely upward from the rear ends of the vehicle frame members 11 and are interconnected behind a seat 13. A battery 14 is placed between the right and left vehicle frame members 12.

A seat stay (not shown) of an inverted U shape is connected to the right and left vehicle frame members 12 and supported with paired right and left stays 15 (only one is shown). The seat 13 attached to the seat stay may be swung up and down.

To the rear end of the vehicle frame members 12 is attached a rear fender 16, on the rear face of which is attached a tail lamp 17, on both sides of which are provided turn signal lamps 18 (only one is shown).

To the rear ends of the right and left vehicle frame members 11 are respectively welded paired right and left rear arm brackets 19 (only one is shown). A rear arm 20 is supported, at its front end, to be swung up and down about a pivot shaft 21 on the rear arm brackets 19. A rear wheel 22 as a drive wheel is rotatably supported at the rear end of the rear arm 20. The rear arm 20 and the rear wheel 22 are suspended through a rear damper 23 with the vehicle frame members 12.

Below the right and left vehicle frame members 11 are respectively attached footsteps 24 (only one is shown). A side stand 25 to be turned about a shaft 26 is provided at the lower part of the rear arm 20. The side stand 25 is urged with a return spring 27 toward an upward stowing side.

In a nearly round space near the rear end of the rear arm 20 is accommodated an axial gap type of electric motor 28 that is thin and low-profile in the vehicle width direction.

The electric motor 28 and its surroundings are described below in two different constitutions, in the first and second embodiments.

Figure 2:
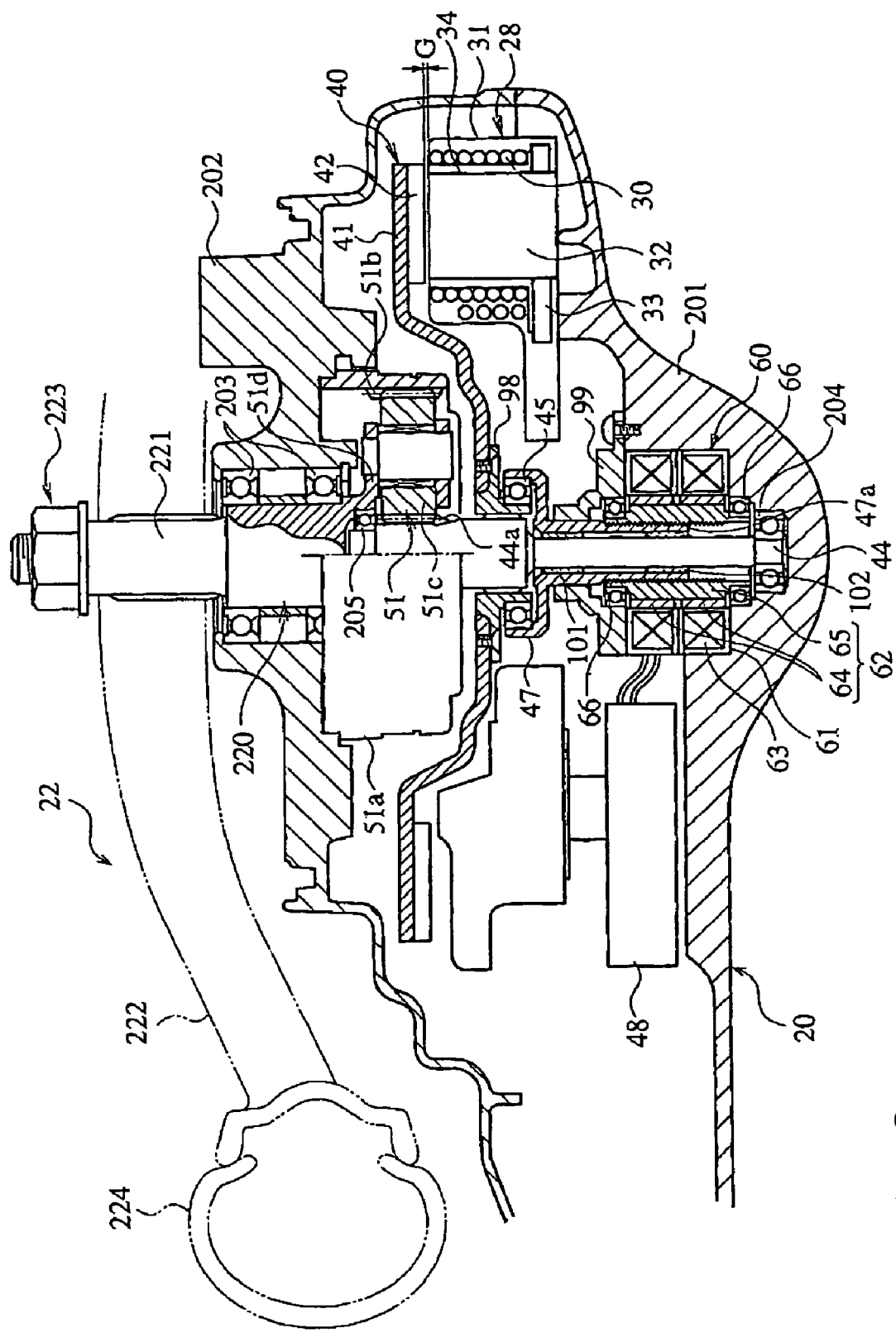
FIG. 2 shows a first embodiment of the constitution of an electric motor 28 and its surroundings.

FIG. 2 shows the first embodiment.

In FIG. 2, the upward direction of the drawing corresponds to the right of the vehicle body while the leftward direction of the drawing corresponds to the front of the vehicle body.

A cover 202 is attached to a housing or case 201 (motor case) in the rear part of the rear arm 20. A bearing 204 is provided in the inside central part of the case 201. Bearings 203 are provided in the inside central part of the cover 202. A rotary shaft 220 made up of a rear wheel shaft (output shaft) 221 and a rotor shaft 44 is rotatably supported with the bearings 203 and the bearing 204. A wheel 222 is attached to the rear wheel shaft 221 and tightened with a nut 223 from out side to rotate together with the rear wheel shaft 221. A tire 224 is provided on the external circumference of the wheel 222.

The electric motor 28 is mainly made up of a stator 31 and a rotor 40. The stator 31 is constructed with a disk-shaped (nearly ring-shaped) stator yoke 33, a plural number of teeth 32 inserted and fixed into a plural number of fitting holes made in a generally circular shape an the stator yoke 33 around the rear wheel shaft 221, and coils 30 each wound around each tooth 32 through a bobbin (insulator) 34, and molded with a resin or the like. The rotor 40 is attached to be rotatable, relative to the stator 31, about the rear wheel shaft 221.

One end of a rotor shaft 44 placed in the rotation center of the rotor 40 is supported, with the bearing 204 fixed to the case 201, to be freely rotatable but immovable in the axial direction. The other end of the rotor shaft 44 is supported at the lower part of the rear wheel shaft 221, with a bearing 205, to be freely rotatable but immovable in the axial direction.

A planetary gear reducer 51 is provided around the upper part of the rotor shaft 44. The rotor shaft 44 is connected through the planetary gear reducer 51 to the wheel shaft 221. The planetary gear reducer 51 reduces the rotational speed of the rotor shaft 44 and transmits forces to the rear wheel shaft 221.

The planetary gear reducer 51 includes a housing 51a housed in the cover 202, a ring gear 51b provided inside the housing 51a, a planetary gear 51c meshing with both the ring gear 51b and a sun gear 44a formed around the rotor shaft 44 and making both rotation and revolution, and a support plate 51d for supporting the planetary gear 51c. The support plate 51d is made integral with the lower part of the rear wheel shaft 221. The center of revolution of the planetary gear 51c and the center of rotation of the rotor shaft 44 are on the same axis.

The stator 31 is housed in and secured to the case 201 with bolts or the like.

The rotor 40 has a disk-like yoke 41. The yoke 41 is made by drawing a ring-shape-punched metallic plate in two steps, with its outer circumferential portion on one surface securely provided with a ring-shaped magnet 42 magnetized in alternate, plural polarities. The magnet 42 is placed with a gap G in the axial direction of the rotor shaft 44 (hereinafter simply referred to as axial direction) relative to the stator 31.

The central part of the yoke 41 is provided with a through hole into which is fit the upper part of a bracket 98. Part of the bracket 98 below the fitting portion is radially extended and secured to the yoke 41 using bolts or the like.

A bearing 45 is fit from the outside to the lower side of the bracket 98. The inside round surface of the bracket 98 is provided with an axially extending groove (slit). The slit engages with a raised portion on the outside round surface of the rotor shaft 44. In other words, the bracket 98 and the rotor shaft 44 are coupled with the so-called serrations. Therefore, the yoke 41 connected to the bracket 98 is made to rotate together with the rotor shaft 44 and permitted to slide in the axial direction relative to the rotor shaft 44.

A movable member 47 is of a cylindrical shape with its upper part radially extending and then rising again to be a cylindrical shape. The upper part fits to the outer surface of the bearing 45. The lower part of the movable member 47 surrounds the rotor shaft 44 through a gap.

Figure 3:
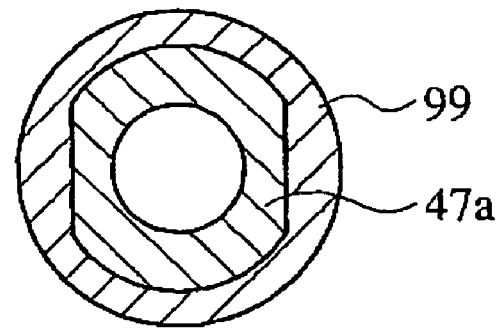
FIGS. 3(a), 3(b) and 3(c) shows cross sections as seen in the axial direction of the engagement portions of a slider 47a and a rotation stop member 99.
Figure 3:
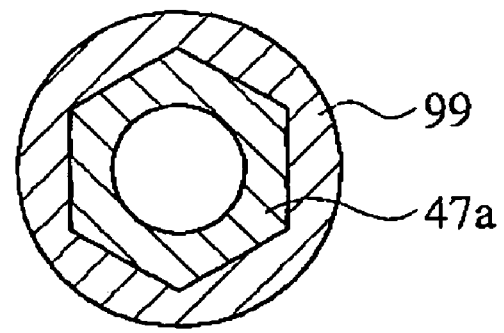
Figure 3:
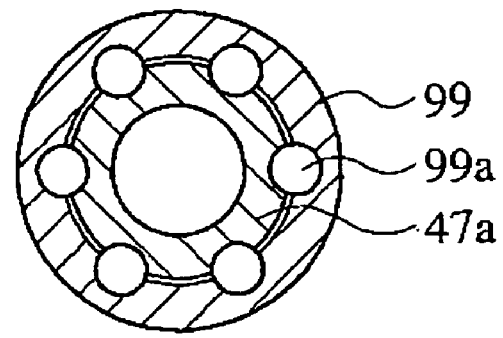

The lower part of the movable member 47 is referred to as a slider 47a. Part of the upper outside circumference of the slider 47*a* is formed to be flat surfaces. A cylindrical rotation stop member 99 is placed coaxially around the upper outside circumference of the slider 47*a*. The inside circumference of the rotation stop member 99 engages with the upper outside circumference of the slider 47*a*, so that the rotation stop member 99 and the slider 47*a* engage with each other to rotate like a single member. However, the lower part of the rotation stop member 99 extends in a flange shape and secured to the case 201. Therefore, the slider 47*a* is permitted to move axially but prevented from rotating about its axis. The cross-sectional shape of the engaging portion of the slider 47*a* and the rotation stop member 99 maybe a circle with at least one straight line as shown in FIG. 3(*a*), or a polygon as shown in FIG. 3(*b*). Furthermore, the shapes of the slider 47*a* and the rotation stop member 99 need not be generally similar but may be any shape as long as they engage with each other to prevent relative rotation. Furthermore, it may be constituted as shown in FIG. 3(*c*) in which the opposing surfaces of the slider 47*a* and the rotation stop member 99 are each provided with at least one axial groove and a ball such as a metallic ball is inserted between both grooves.

Here, in the electric motor 28, part of the teeth 32 and the coils 30 of the stator 31 are removed and an electric circuit (not shown) is placed in that part. Therefore, force for attracting the magnet 42 becomes weak in that part. This produces a force in the direction of tilting the rotor 40 relative to the rotor shaft 44 and of tilting the movable member 47 through the bearing 45 relative to the rotor shaft 44. This results in the increase in friction (loss) in the sliding and rotating portions in the serration engaging portion of the bracket 98 and the rotor shaft 44, in the engaging portion of the slider 47*a* and the rotation stop member 99, and in the spiral engaging portion of the slider 47*a* and the cylindrical member 65 of the rotor 62, and gives rise to such problems as necessity of increasing torque of the stepping motor 60 and increased wear of components.

In the embodiments of this invention, these problems are solved with the following constitution. Cylindrical, oil-impregnated bearings 101 and 102 are inserted between the inner round surface of the slider 47*a* and the outer round surface of the rotor shaft 44. To put it more precisely, the oil-impregnated bearing 101 is placed at the fore-end portion of the slider 47*a* or in the vicinity of the bearing 45, while the oil-impregnated bearing 102 is placed around the base end portion of the slider 47*a*. As a result, the inside round surfaces of the oil-impregnated bearings 101 and 102 slide on the outside round surface of the rotor shaft 44. As a result, the movable member 47 and the rotor 40 are restricted from tilting relative to the rotor shaft 44, so that friction force is prevented from increasing and wear is prevented from occurring in the engaging portions of the rotor shaft 44, the bracket 98, the slider 47*a*, the rotation stop member 99, and the cylindrical member 65.

The stepping motor 60 is an adjusting motor for adjusting relative rotary positions of the rotor 40 and the stator 31, having coaxially placed cylindrical stator 61 on the outer side and a cylindrical rotor 62 on the inner side. The stator 61 is secured to the case 201. The case 201 is provided with a driving circuit 48 for driving the stepping motor 60.

The stator 61 is provided with a plural number of coils 63 connected electrically to the driving circuit 48.

The rotor 62 includes a magnet 64 having a plural number of magnetic poles and placed with a clearance from the stator 61, and a cylindrical member 65 on the inner side. The cylindrical member 65 is supported at its upper and lower portions with respective bearings 66 respectively fit to the case 201 and the rotation stop member 99. The cylindrical member 65 is formed with threads on its inside round surface to mesh with threads provided on the lower outside round surface of the slider 47*a*. It may be otherwise constituted that the inside round surface of the cylindrical member 65 is formed with spiral corrugations such as skewed serrations while the lower outside surface of the slider 47*a* of the movable member 47 is also formed with spiral corrugations to make the serrations on both parts engage with each other, or that one of the cylindrical member 65 and the slider 47*a* is provided with a spiral slot while the other is provided with a pin for fitting into the slot.

The movable member 47 is adapted to convert the rotation of the stepping motor 60 into the axial motion of the movable member 47 itself. The converting action is made possible as the rotation stop member 99 prevents the movable member 47 from rotating along with the rotation of the rotor 62.

Now, when the driving circuit 48 excites the coils 63 of the stator 61, the rotor 62 rotates. Then, the movable member 47 spirally engaging through the slider 47*a* with the cylindrical member 65 moves up as seen in the drawing. Along with this motion, the yoke 41 also moves up. Therefore, the gap G increases. Here, because the movable member 47 and the yoke 41 are interconnected through the bearing 45, it is possible to move the yoke 41 while it is allowed to rotate.

In contrast, when the driving circuit 48 excites the coils 63 of the stator 61 to rotate the rotor 62 in the reverse direction of the above-mentioned direction, the movable member 47 spirally engaging through the slider 47*a* with the cylindrical member 65 moves down as seen in the drawing. Along with this motion, the yoke 41 also moves down. Therefore, the gap G decreases. Also here, because the movable member 47 and the yoke 41 are interconnected through the bearing 45, it is possible to move the yoke 41 while it is allowed to rotate.

Incidentally, the driving circuit 48 is capable of driving the stepping motor 60 even when the electric motor 28 is standing. Therefore, it is possible to alleviate the effort of the rider in rolling by controlling to widen the gap G.

Figure 4:
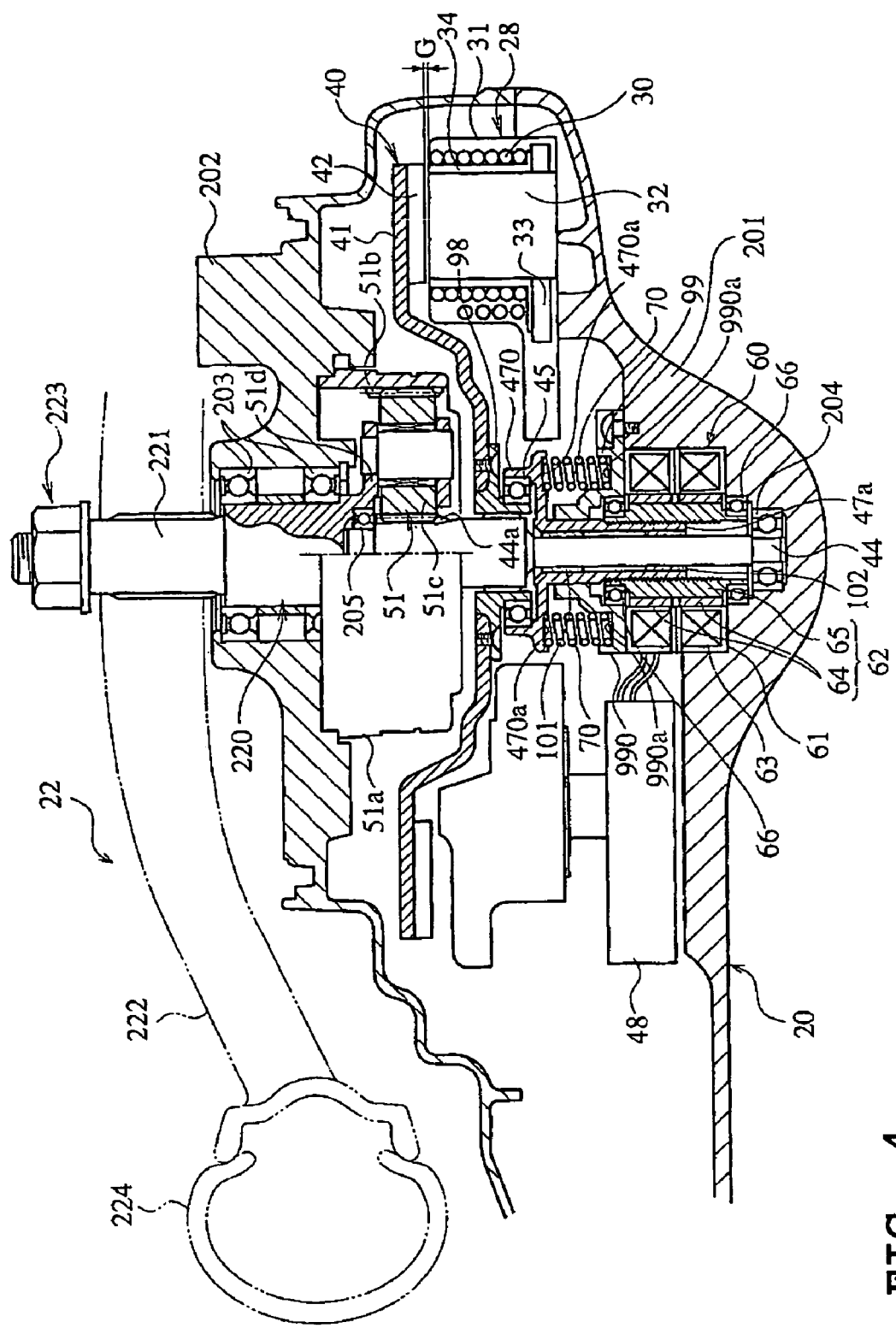
FIG. 4 shows a second embodiment of the constitution of the electric motor 28 and its surroundings.

FIG. 4 shows the second embodiment.

Components that are the same as or have the same functions as that in the first embodiment are provided with the same reference numerals and explanations are made for only items that are different.

A movable member 470 is made by forming a plural number of circular recesses 470*a* on the underside of radially extended portion of the movable member 47. A rotation stop member 990 is made by providing the upper side of the flange portion of the rotation stop member 99 with a plural number of recesses 990*a* opposing the recesses 470*a*. A coil spring (resilient member) 70 is interposed between each recess 470*a* and each recess 990*a* opposing each recess 470*a*. Each coil spring 70 exerts a force onto the movable member 470 in the direction of offsetting the force produced and exerted, by magnetic attraction between the rotor 40 and the stator 61, onto the movable member 470.

Figure 5:
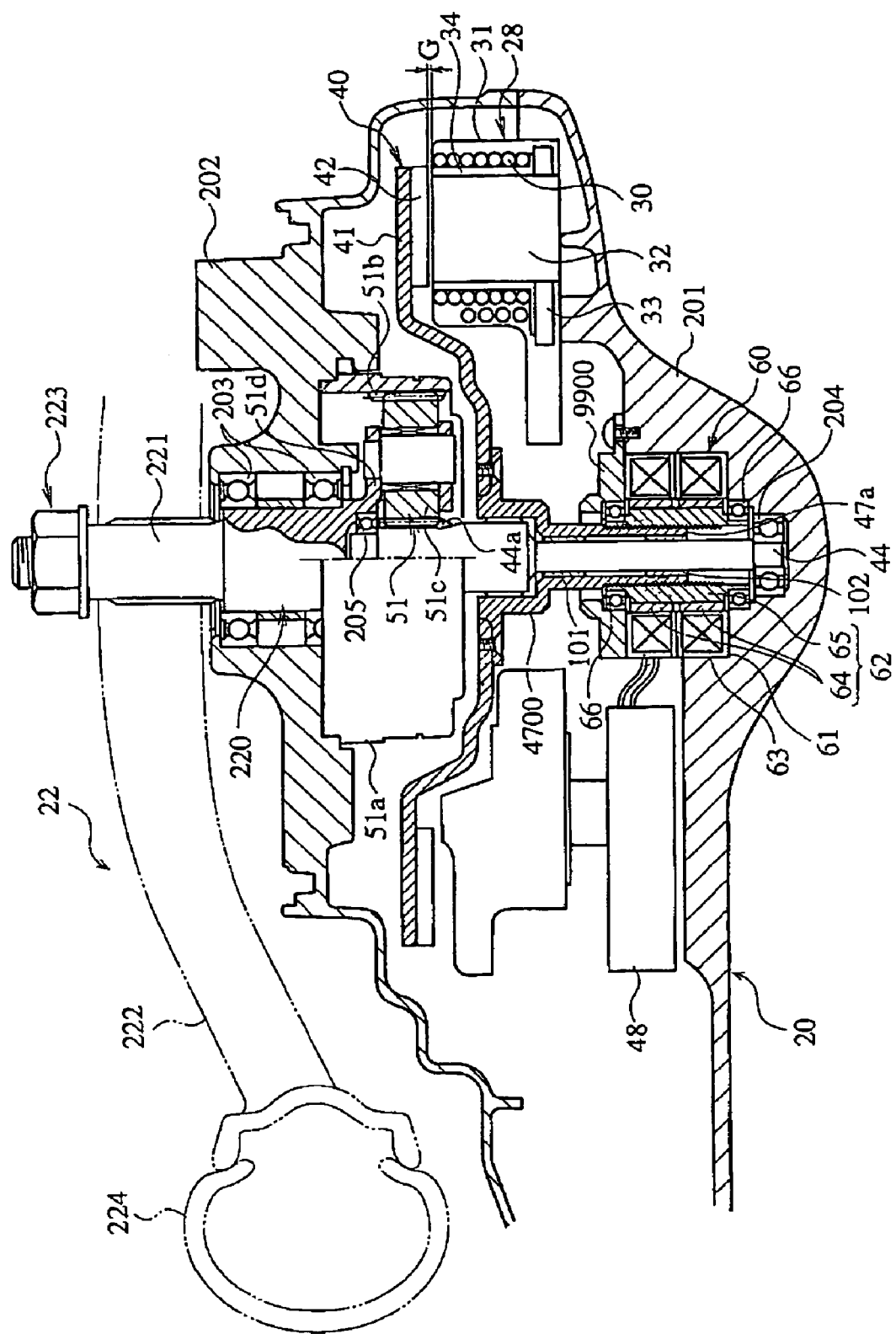
FIG. 5 shows a third embodiment of the constitution of the electric motor 28 and its surroundings.
Figure 6:
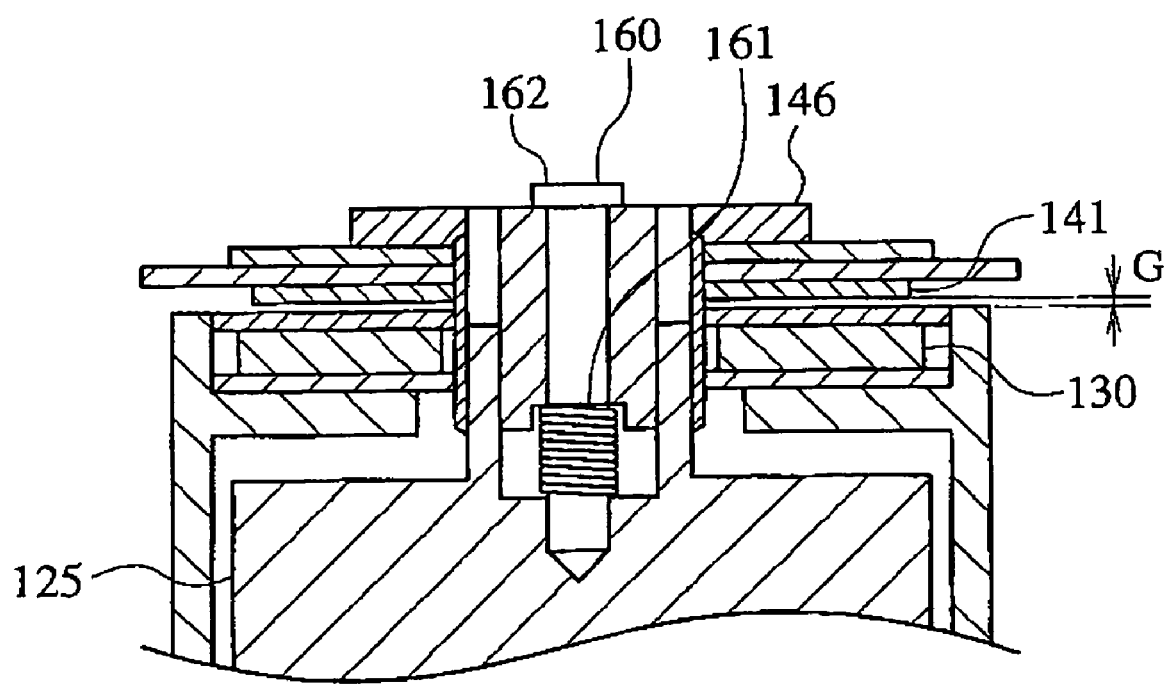
FIG. 6 shows a constitution of a conventional, gap-adjustable electric motor.

FIG. 5 shows the third embodiment.

Components that are the same as or have the same functions as that in the first embodiment are provided with the same reference numerals and explanations are made for only items that are different.

A movable member 4700 is made by joining together the movable member 47 and the bracket 98. A member 9900 is made by adapting that the inside round surface of the rotation stop member 99 is spaced from the movable member 4700 and is used not for stopping the rotation of the movable member 4700 but for securing the stepping motor 60 to the case 201.

With the third embodiment, when the driving circuit 48 excites the coils 63 of the stator 61, the rotor 62 rotates. In a situation in which the gap G should be held constant, the driving circuit 48 controls so that the rotor 62 rotates at the same revolution as the rotating rotor 40, without relative rotation in between.

On the other hand, in a situation in which the gap G should be increased, the driving circuit 48 controls so that the rotor 62 rotates relative to the rotating rotor 40 in a specified direction. Then, the movable member 4700 in spiral engagement with the cylindrical member 65 rotates and moves up as seen in the drawing, along with which the yoke 41 also moves up, so that the gap G increases.

In contrast, when the driving circuit 48 excites the coils 63 of the stator 61 and the rotor 62 rotates relatively in the reverse direction of the above-mentioned direction, the movable member 4700 in spiral engagement through the slider 47*a* with the cylindrical member 65 rotates and moves down as seen in the drawing, along with which the yoke 41 also moves down, so that the gap G decreases.

With the third embodiment as described above, because the rotor 62 rotates relatively to the rotor 40, it is possible to disuse the rotation stop member 99 or the like engaging with the outside circumference of the slider 47*a*.

According to the embodiments of this invention as described above, the rotary electric machine is constituted with: the rotary shaft 220; the rotor 40 connected to the rotary shaft 220; the stator 31 placed opposite the rotor 40; the stepping motor 60 serving as the adjusting motor for adjusting the position of the rotor 40 relative to the stator 31 in the rotary axis direction; and the movable member 47 or the like that is engage-connected to the rotor 40, converts the rotation of the adjusting motor 60 into the displacement of the movable member 47 in the axial direction of the rotary shaft 220.

In other words, as for the axial gap type of rotary electric machine using the electric motor 28, because the movable member 47 or the like moved axially with the rotation of the adjusting motor is engage-connected to the rotor 40, the gap between the rotor 40 and the stator 31 is adjustable. Therefore, it is possible to provide the rotary electric machine which the amount of magnetic flux of the magnet 42 can be actively adjusted, so that the output characteristic can be optionally changed by increasing the amount of magnetic flux when a great torque is required or by decreasing the amount of magnetic flux when a small torque is required, and further it is possible to reduce the resisting force in rolling due to magnetic attraction of the motor by reducing the amount of magnetic flux. Because the opposing areas of the rotor 40 and the stator is adjustable for the radial axial gap type of rotary electric machine, and because the gap between and the opposing areas of the rotor 40 and the stator are adjustable for the rotary electric machine having a conical gap, the same functional effect is obtained.

Incidentally, the term engaged used herein means either completely fixed, fit to the extent of clearance-fit, or merely in contact. The movable member 47 or the like may be either completely connected to the rotor 40 or not completely connected as long as the rotor 40 is prevented from being moved toward the stator by the magnetic attraction force.

For example, it is possible to move the rotor by bringing the movable member 47 or the like into contact with the rotor 40 to push the rotor 40 in the direction opposite the magnetic attractive force. In the direction of the magnetic attractive force, it is not necessarily required to pull the rotor 40 with the movable member. It is possible to move the rotor 40 to a specified position with the magnetic attractive force by moving the movable member.

Besides, in the case the movable member is placed on the side of pulling the rotor 40 against the magnetic attraction force, it is also possible to bring into contact the movable member with the rotor 40 and pull the rotor 40. In the direction of magnetic attraction force, it is possible to move the rotor 40 up to a specified position with magnetic attraction force.

Because the rotor 40, rather than the heavy stator 31 made of iron core and copper wire, is moved, a small adjusting motor suffices for the purpose.

When applied to electric motor vehicle or the like, the rotary electric machine receives heavy vibration and impact loads. Therefore, the heavy stator must stand heavy loads. If the stator were to be moved, it could not be firmly secured to the case with bolts. A mechanism for preventing rotation while permitting axial motion would have to coexist with a constitution standing heavy loads, which would result in a heavy weight. That is the reason for making move the rotor 40 to preclude the above problems.

Because the rotor 62 of the adjusting motor (60) engages spirally with the movable member 47 or the like so that relative motion is permitted, the amount of motion of the movable member 47 may be controlled with the relative rotation of the rotor 62 and the movable member 47.

As example mechanisms enabling spiral relative motion, there are a helical gears engagement or skewed teeth engagement, and an engagement using a spiral slot engaging with a pin.

The movable member 47 or the like is rotatably engaged through the bearing or the like to the rotor 40 and prevents the movable member from being rotated by the rotation of the rotor of the adjusting motor (60), and the movable member 47 or the like move securely in the axial direction along with the rotation of the adjusting motor (60). Therefore, fine control is possible. Besides, because the movable member 47 or the like does not rotate irrespective of the state of the rotary electric machine rotating or standing, there is no need for a complicated control such as controlling the rotational speed of the adjusting motor (60) according to the state of the rotor 40 of the rotary electric machine, or rotating the rotor of the adjusting motor (60) at the same rotational speed as the rotor 40 of the rotary electric machine when the rotor 40 of the rotary electric machine is not moved axially. Besides, the adjusting motor (60) has only to make necessary rotation for the amount of axial motion. As a result, the electric motor is provided that can reduce power consumption.

The movable member 47 or the like is fit around the rotor shaft of the adjusting motor by means of the rotation stop member 99 fixed around the rotor shaft of the adjusting motor, not to be relatively rotatable around but slidable in the direction of the rotor shaft of the adjusting motor. Therefore, it is possible to provide a rotary electric machine with which rotation of the movable member 47 or the like is securely prevented.

Because the cross section of the rotation stop portion of the rotation stop member 99 or the like is made in a particular shape, it is possible to provide a rotary electric machine with which rotation of the movable member 47 or the like is securely prevented. The particular shape here means any shape that is not circular.

In another constitution shown in FIG. 3(*c*), opposing surfaces of the movable member 47 or the like and the rotation stop member 99 secured around the rotor shaft of the adjusting motor (60) are each provided with at least one groove in the direction of the rotor shaft of the adjusting motor, and a ball is interposed between each groove on the movable member side and each groove on the rotation stop member side. Therefore, it is possible to securely prevent the movable member from rotating, to permit smooth sliding of the movable member in the axial direction, and to reduce frictional loss of the movable member. As a result, a compact rotary electric machine is provided because the adjusting motor is downsized owing to its reduced torque.

Because the rotor 62 of the adjusting motor (60) is in spiral engagement with the movable member 47, it is possible to provide a rotary electric machine capable of performing fine control by reducing the amount of travel of the movable member per revolution of the adjusting motor.

In the second embodiment, the spring (70) is provided to force the movable member 47 or the like in the direction of offsetting the force acting on the movable member 47 or the like due to magnetic attraction force produced between the rotor 40 of the rotary electric machine and the stator 31. Therefore, the force required to move the movable member is reduced and the frictional force in the engagement portion between the movable member and the rotor of the adjusting motor is reduced. As a result, a compact, high-efficiency rotary electric machine is provided because the adjusting motor is downsized owing to its reduced torque.

Because a stepping motor is used as the adjusting motor, it is possible to control the amount of rotation with the number of driving pulses and eliminate a sensor or the like for detecting the amount of rotation (or the amount of travel). As a result, it is possible to provide a rotary electric machine with which the adjusting motor is made at a low cost and the control is made simple.

Because the above-described rotary electric machine is used in the electric motorcycle 1 of this embodiment, it is possible to provide an electric motor vehicle that is capable of optionally changing the driving characteristic, and reducing the rolling resisting force produced with a magnetic attraction force.

Incidentally, while the rotary electric machine in this embodiment is assumed to be an electric motor, the rotary electric machine in this embodiment is not limited to the electric motor but may also be a generator or a rotary electric machine used both as an electric motor and a generator such as one used for regenerative braking.

While this embodiment is assumed to adjust the output characteristic by changing the gap in the axial gap type of the rotary electric machine, this invention does not limit the type of rotary electric machine as long as the output characteristic is adjusted with the change in the amount of magnetic flux by adjusting relative axial positions of the rotor and stator of the rotary electric machine. For example, with a radial gap type of rotary electric machine having a cylindrical gap, the amount of magnetic flux may be changed by changing the opposing areas without changing the gap spacing with the axial relative position change between rotator and stator. Or with a rotary electric machine having a conical gap, the amount of magnetic flux may be changed by changing both the gap spacing and opposing areas with the axial relative position change between rotator and stator.

While the magnet is placed on the rotor side according to this embodiment, the present invention is not limited to this. Rather, the magnet may be placed on the stator side and the coils may be placed on the rotor side.

Moreover, this invention may be applied not only to the electric motorcycle as the above embodiment but to electric motor vehicles having three or more wheels. Furthermore, the driving wheel may not be the rear wheel.

According to this invention as described above, the movable member to be axially moved by the rotation of the adjusting motor is engaged to the rotor. Therefore, it is possible to actively adjust the gap spacing between the rotor and stator for the axial gap type of rotary electric machine, the opposing areas between the rotor and stator for the radial gap type of rotary electric machine, and both the gap and opposing areas between the rotor and stator for the rotary electric machine having a conical gap. Therefore, it is possible to provide a rotary electric machine capable of optionally changing the output characteristic by increasing the amount of magnetic flux when a great torque is required or by reducing the amount of magnetic flux when a high revolution is required. When the rotary electric machine is used as the driving source of an electric motorcycle, resisting force due to the magnetic attraction force of the electric motor can be reduced at the time of rolling by reducing the amount of magnetic flux.

The invention claimed is:

1. A rotary electric machine, comprising:
   a rotary shaft;
   a rotor provided with a disk-shaped yoke centered on the rotary shaft;
   a stator placed opposite the rotor;
   an electric motor for rotary-driving; and
   a movable member of a cylindrical shape surrounding the rotary shaft, with one end of the cylinder engage-connected to a central portion of the rotor, for adjusting a gap between the yoke and the stator by converting rotation of the electric motor into displacement in an axial direction and moving in the axial direction.

2. The rotary electric machine according to claim 1, wherein the rotor is made rotatable relative to the stator by fitting one end of the movable member to the central portion of the rotor through a bearing.

3. The rotary electric machine according to claim 1, wherein the movable member is rotatably engaged to the rotor, and a means is provided for preventing the movable member from rotating together with the rotation of the rotor of the electric motor.

4. The rotary electric machine according to claim 3, wherein the movable member engages with a rotation stop member fit around the rotor shaft of the electric motor so as to be incapable of making a relative rotation around but slidable in the axial direction of the rotor shaft of the electric motor.

5. The rotary electric machine according to claim 4, wherein a rotation stop portion of the rotation stop member is formed in a particular shape in cross section.

6. The rotary electric machine according to claim 4, wherein opposing surfaces of the movable member and the rotation stop member fixed around the rotor shaft of the electric motor are each provided with at least one groove in a direction of the rotor shaft of the electric motor, and a ball is placed between each groove on the movable member side and each groove on the rotation stop member side.

7. The rotary electric machine according to claim 1, wherein the rotor of the electric motor is in spiral engagement with the movable member.

8. The rotary electric machine according to claim 1, wherein a resilient member is provided to urge the movable member in a direction of offsetting a force exerted to the movable member due to a magnetic attractive force produced between the rotor and the stator.

9. The rotary electric machine according to claim 1, wherein the electric motor is a stepping motor.

10. An electric motor vehicle using the rotary electric machine according to claim 1 as the driving source.

11. The rotary electric machine according to claim 1, wherein a cylindrical, oil-impregnated bearing is interposed between the movable member and the rotary shaft.

12. A rotary electric machine comprising:
    a rotary shaft;

a rotor provided with a disk-shaped yoke centered on the rotary shaft;

a stator placed opposite the rotor;

means for rotary-driving; and a movable member of a cylindrical shape surrounding the rotary shaft, with one end of the cylinder engage-connected to a central portion of the rotor, for adjusting a gap between the yoke and the stator by converting rotation of the means for rotary-driving into displacement in an axial direction and moving in the axial direction.

13. The rotary electric machine according to claim 12, wherein the rotor is made rotatable relative to the stator by fitting one end of the movable member to the central portion of the rotor through a bearing.

14. The rotary electric machine according to claim 12, wherein a cylindrical, oil-impregnated bearing is interposed between the movable member and the rotary shaft.

15. The rotary electric machine according to claim 12, wherein the movable member is rotatably engaged to the rotor, and a means is provided for preventing the movable member from rotating together with the rotation of the rotor of the means for rotary-driving.

16. The rotary electric machine according to claim 15, wherein the movable member engages with a rotation stop member fit around the rotor shaft of the means for rotary-driving so as to be incapable of making a relative rotation around but slidable in the axial direction of the rotor shaft of the means for rotary-driving.

17. The rotary electric machine according to claim 16, wherein a rotation stop portion of the rotation stop member is formed in a particular shape in cross section.

18. The rotary electric machine according to claim 16, wherein opposing surfaces of the movable member and the rotation stop member fixed around the rotor shaft of the means for rotary-driving are each provided with at least one groove in a direction of the rotor shaft of the means for rotary-driving, and a ball is placed between each groove on the movable member side and each groove on the rotation stop member side.

19. The rotary electric machine according to claim 12, wherein the rotor of the means for rotary-driving is in spiral engagement with the movable member.

* * * * *